Jan. 14, 1941.  R. E. VENDERBUSH  2,228,425
AIR CLEANER
Filed Feb. 28, 1938  3 Sheets-Sheet 1

Inventor
RAY E. VENDERBUSH
By J. S. Murray
Attorney

Jan. 14, 1941.    R. E. VENDERBUSH    2,228,425
AIR CLEANER
Filed Feb. 28, 1938    3 Sheets-Sheet 2
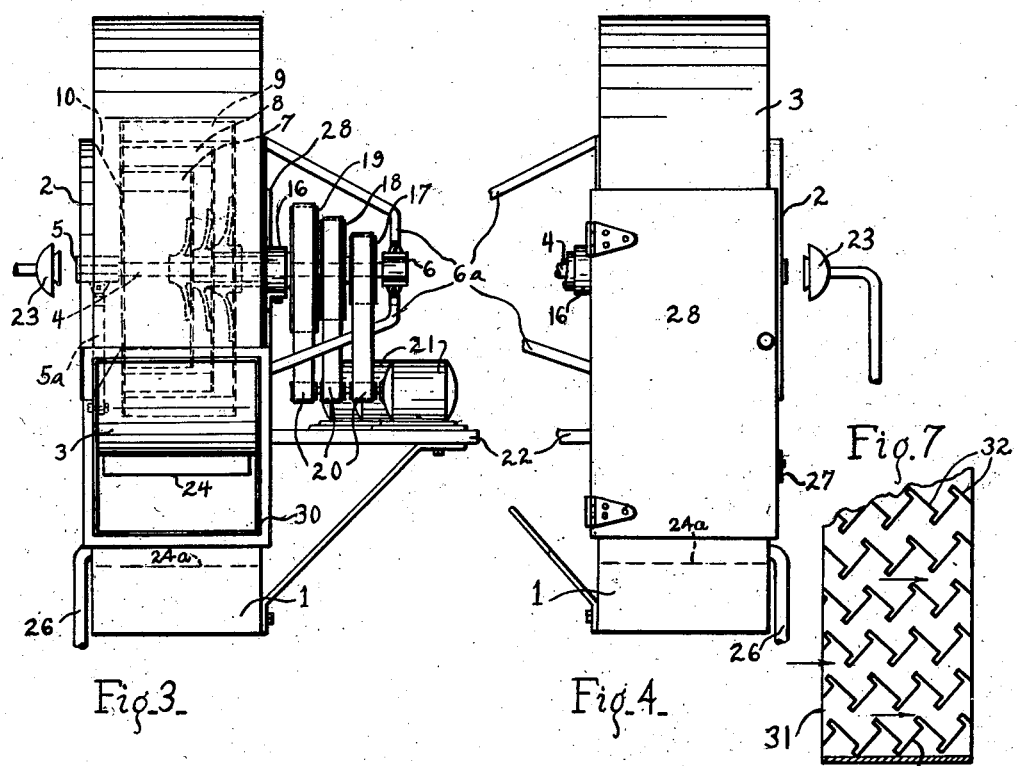
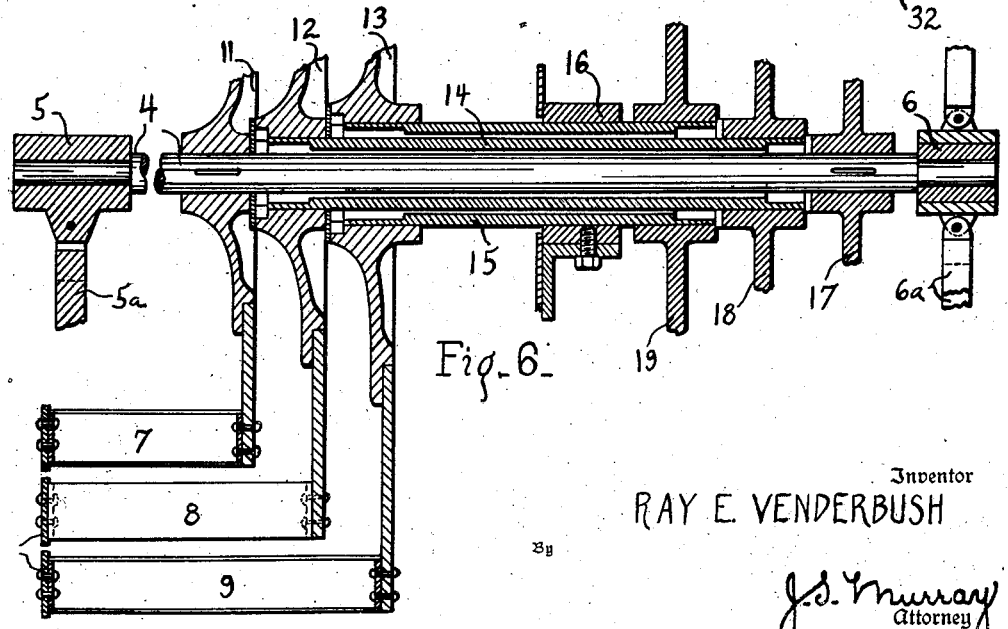
Inventor
RAY E. VENDERBUSH
By J. S. Murray
Attorney Jan. 14, 1941. R. E. VENDERBUSH 2,228,425
AIR CLEANER
Filed Feb. 28, 1938 3 Sheets-Sheet 3
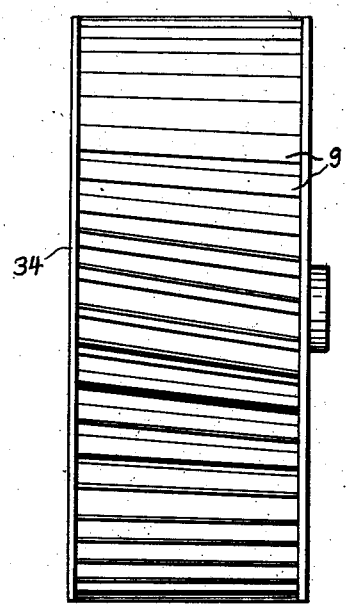
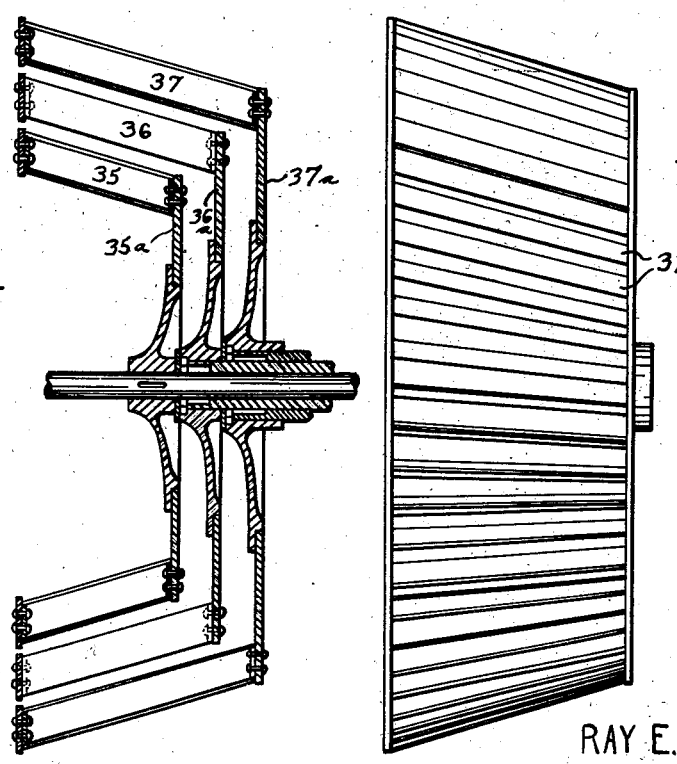
Inventor
RAY E. VENDERBUSH Patented Jan. 14, 1941

2,228,425

UNITED STATES PATENT OFFICE 2,228,425

AIR CLEANER

Raymond E. Venderbush, Detroit, Mich.

Application February 28, 1938, Serial No. 192,909

9 Claims. (Cl. 261—90)

This invention relates to air cleaners and particularly air cleaners of a wet type, such as employ water or other suitable liquid to remove dust from flowing air.

An object of the invention is to provide a blower for maintaining a flow of air to be cleaned, such blower being especially adapted to effect a thorough cleansing of the air with water.

Another object is to provide a blower for maintaining a flow of air and effecting a thorough washing of the air with water, such blower comprising a plurality of fan wheels of a squirrel cage type, rotating one within another at different speeds, to draw the air outwardly successively through the blades of the several wheels so as to thoroughly treat the air with the water.

Another object is to rotate one or more of said fan wheels reversely to adjacent fan wheels, to increase the turbulence of the air and water and more thoroughly subject the former to the latter.

A further object is to provide for a continuous downward discharge of sludge, accumulating on the walls of the blower housing, without permitting cleaned air flowing beneath such housing to be contaminated by such sludge.

A further object is to utilize the bottom portion of the casing of the described air cleaner, as a tank, in which a supply of water is maintained to exercise a further cleaning effect on air discharging from the blower above such water, said tank additionally serving to accumulate all sludge formed by the removal of dust or smoke from the air.

Another object is to provide for largely eliminating water from the air in the course of its discharge from said blower.

A further object is to adapt the water eliminator to be raised from its normal position, and thus render it more readily accessible for cleaning.

A still further object is to provide convenient access to said tank for the purpose of removing sludge therefrom.

These and various other objects the invention attains by the construction hereinafter described and illustrated in the accompanying drawings, wherein:

Fig. 3 is a view of the outlet end of the air cleaner.

Fig. 4 is a view of the opposite end.

Fig. 6 is an enlarged vertical sectional view, taken on the line 6—6 of Fig. 2, and disclosing the main blower shaft and tubular shafts journaled thereon.

Fig. 7 is an enlarged horizontal sectional view, taken on the line 7—7 of Fig. 2, showing the preferred construction of the water eliminator employed in the apparatus.

Fig. 8 is a side elevation of one of the fan wheels.

Fig. 9 is a diametrical sectional view of a modified type of fan wheel assembly that may be employed in the air cleaner.

Fig. 10 is a side elevational view of one of the fan wheels shown in Fig. 9.

Figure 1:
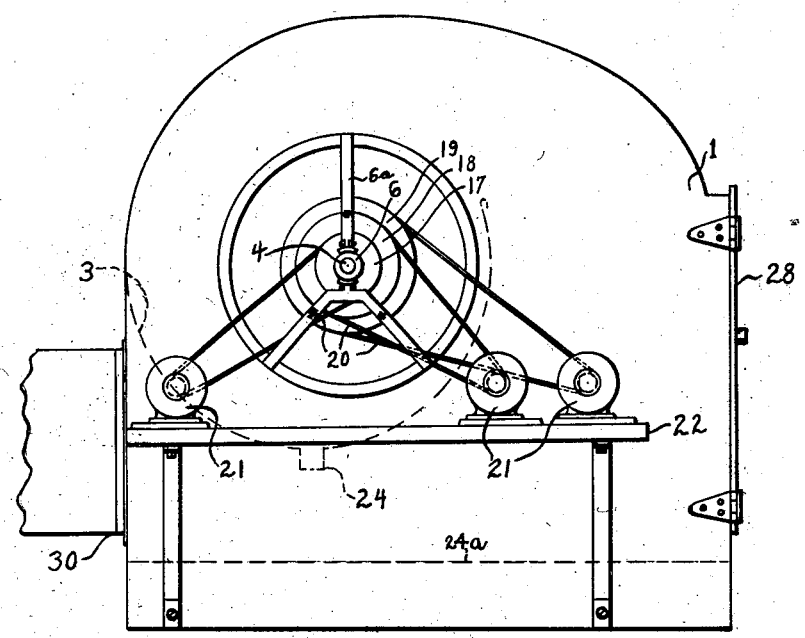
Fig. 1 is an elevational view of one side of the improved air cleaner, showing its drive motors.

In these views, the reference character 1 designates the air cleaner casing, constructed preferably of sheet metal, and having one of its side walls substantially imperforate and the other formed with a circular air inlet 2, opening into the central portion of an approximately spiral blower housing 3, formed partly within and partly by said casing. Transversely mounted in the housing 3 and laterally projecting beyond the closed wall of the casing, is a main shaft 4, coaxial with the air inlet and terminally journaled in bearings 5 and 6 mounted on supports 5a and 6a carried by the casing. Coaxially mounted within the blower housing, opposite the inlet 2, are three centrifugal fan wheels 7, 8, and 9, arranged one within another and comprising horizontal blades, the blades of the wheel 8 being within and adjacent to those of the wheel 9, and the blades of the wheel 7 being within and adjacent to those of the wheel 8. A funnel-shaped fitting 10 extends from the perimeter of said inlet 2 to a point adjacent the inner free edges of the blades of the fan wheel 7 to confine inflowing air. Said blades are carried at the peripheries of circular mounting plates or discs 11, 12, and 13, the disc 11 being fixed on the main shaft, the disc 12 fixed on a tubular shaft 14, journaled on the main shaft, and the disc 13 fixed on a second and outer tubular shaft 15, journaled on the shaft 14. Approximately midway between the bearings 5 and 6, the shaft 15 is further journaled in a bearing 16 exteriorly mounted on the closed wall of the casing 1. Pulleys 17, 18, and 19, fixed on said shafts between the bearings 6 and 16, are driven through belts 20 by motors 21, mounted on a shelf 22 suitably carried by the casing.

Figure 5:
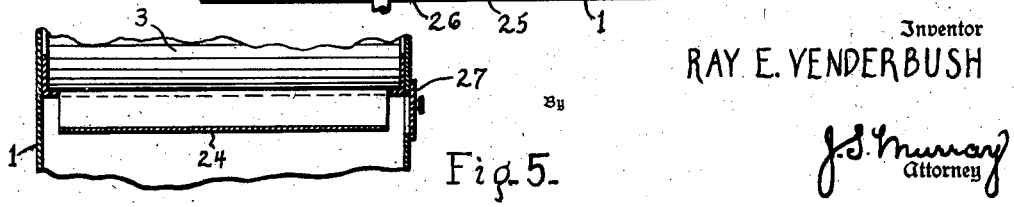
Fig. 5 is a sectional view, taken on the line 5—5 of Fig. 2, showing a sludge box or trough, employed in the cleaner.

An exterior nozzle 23, facing said air inlet, delivers a conical spray of water against the rotating fan blades to wash the dust or smoke-laden air, drawn by the fans through the inlet. The resulting dirty water is whirled from the inner to the outer blades and then against the walls of the blower housing and flows down such walls into a sludge box or trough 24, attached to and opening downwardly from the bottom of said housing. Said sludge box is open at its ends, (see Fig. 5) allowing the sludge to discharge at said ends and flow down the sides of the air cleaner casing. The lower portion of the casing I forms a tank, holding an accumulation of water 24a in which the sludge settles. To permit draining sludge from such tank, a normally closed opening 25 is formed in a wall of the casing adjacent to the floor, and, at the desired water level, a water drainage pipe 26 disposes of overflow water.

A small hinged door 27 preferably opens in the casing opposite an end of the sludge box 24, for cleanout purposes, and a much large door 28 opens in one end of the casing I, affording access thereto for general cleaning, and for the removal of sludge from the water tank.

Figure 2:
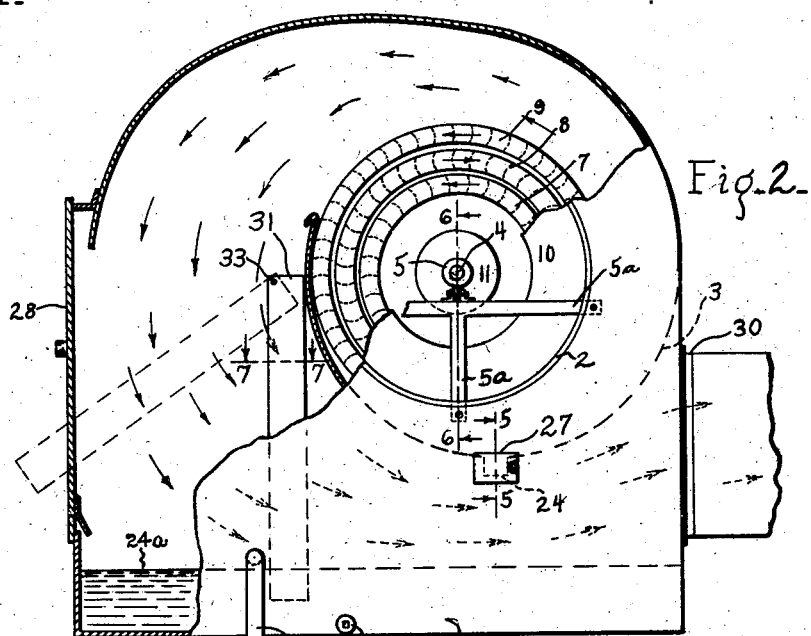
Fig. 2 is an elevational view of the other side, partially in section.

Air drawn into the blower housing by the fan wheels, is thrown outwardly through the blades thereof and discharges downwardly at the end of the casing equipped with the door 28, then flowing beneath said housing to an air outlet 30 in the other end of the casing. The described water treatment unduly humidifies the cleaned air, and it is desirable, in most cases, to remove excess or free moisture before delivering the air to the casing outlet. For this purpose, it is preferred to dispose a water eliminator 31 in the path of the air, such eliminator being illustrated (see Fig. 2) as spaced inwardly from the door 28, its upper end extending tangentially to that portion of the housing 3 which is itself in tangential proximity to the fan wheel 9, the lower end of the eliminator being submerged in the water 24a. The width of the eliminator is equal to that of the casing, so that all air flowing to the outlet 30 must traverse the eliminator. The eliminator may be of any construction presenting numerous surfaces against which the flowing air will impinge and whereon it may deposit moisture. Thus Fig. 7 illustrates an arrangement in which restricted passages for the air are sinuously formed between numerous zig-zag plates 32, which may extend from top to bottom of the rectangular eliminator frame. It is preferred to provide a pivotal support for the eliminator at its upper end, as indicated at 33, so that it may be swung toward the door 28, when desired, to facilitate cleaning of the eliminator and afford full access to the water tank from the opening controlled by said door.

Describing the blades of the fan wheels 7, 8, and 9 in somewhat greater detail, each set of blades is reinforced at their ends adjacent to the air inlet by a ring 34, and preferably the blades have a slight angularity such as to somewhat advance said ends beyond the opposite or supported ends, in the direction of rotation, as best appears in Fig. 8. This has the effect of resolving air pressure applied to each blade, in use, into a large and a small component, the latter acting longitudinally of the blade toward its supported end. Thus the blades are better able to withstand the working pressure for which they are designed.

The modified fan wheel construction shown in Figs. 9 and 10 differs from that already described in that the blades 35, 36, and 37 of the several wheels diverge outwardly from the axis of rotation, in extending from their respective mounting disks 35a, 36a, and 37a. Thus the three sets of blades are frustro-conical, and the central air chamber within the innermost fan wheel gradually decreases in area as it extends in the direction of air travel. This avoids or at least reduces surplus space, since air entering such chamber discharges outwardly between the blades as it advances.

In operation of the described apparatus, the intermediate fan wheel 8 preferably rotates oppositely to the fan wheels 7 and 9, thus subjecting the outflowing air and water to violent turbulence, tending to finely subdivide the water particles and diffuse the resulting mist or fine spray throughout the air, so as to very effectively clean the latter.

Since the three fan wheels are required to handle the same volume of air, they are preferably driven at different speeds, selected to compensate for the difference in the sizes of the wheels, the intermediate wheel turning faster than the outer one and the innermost wheel still faster. It is for this reason that each of the wheels is disclosed as independently driven. Obviously, however, the wheels might be driven in common but differentiated in speed by a suitable gearing or the like.

It is well known, with respect to dust floating in air, that a film or very minute globule of air clings to and surrounds each dust particle, tending to exclude moisture. In passing dust-laden air between the fan wheel blades, as has been described, the dust particles are thrown at high velocity by the inner blades against the adjacent outer blades, and the violent resulting impact disrupts the aforesaid air globules, exposing the dust to a thorough wetting by the water. Such wetting is essential to the desired dust removal, since it is the added weight of water that assures discharge of the dust particles from the air stream and their lodgement on the walls of the blower housing.

It is to be noted that the conical spray is effective on the air before it reaches the blades to exercise a partial cleaning effect, preliminary to the thorough cleaning accomplished in outward flow of the air and water between the blades. The cleansed air is relieved of excess moisture, in flowing through the water eliminator 31, and relatively dry and thoroughly clean air is delivered to the outlet 30.

The door 28 affords easy access to the casing interior for removing such sludge as may fail to discharge through the outlet 25, and the pivotal mounting of the water eliminator permits raising the latter to facilitate its cleaning and afford full access to the water tank for sludge removal or cleaning purposes.

The water employed may be so selected as regards its temperature as to predeterminedly heat or cool the air, so that the apparatus may serve to condition as well as clean the air. Because of the cooling effect which may thus be exercised, the described cleaner is especially suited for cleaning hot gases, which in the absence of cooling water might warp or otherwise damage the fan blades.

The invention is presented as including all such modifications and changes as come within the scope of the following claims.

What I claim is:

1. An air cleaner comprising a casing, a fan wheel journaled in the upper portion of the casing, the casing having an inlet adapted to deliver dust-laden air to the fan wheel, and having an outlet for cleaned air, means for delivering an air-cleaning liquid to the fan wheel in the approximate direction of air flow, a tank in the lower portion of the casing, a partition in the casing disposed beneath said fan wheel and coacting with the casing to form a housing for the fan wheel, said partition having an opening for delivering sludge to the tank, and a member downwardly extending from said partition to the tank disposed in the path of the cleaned air and forming passages for the air, the walls of which passages are designed to remove excess liquid from the air.

2. An air cleaner as set forth in claim 1, the last-mentioned member being pivotally movable on the casing to facilitate its cleaning.

3. An air cleaner comprising a casing, a fan wheel journaled in the upper portion of the casing, the casing having an inlet adapted to deliver dust-laden air to the fan wheel, and having an outlet for cleaned air, means for delivering an air-cleaning liquid to the fan wheel in the approximate direction of air flow, a tank in the lower portion of the casing, a partition in the casing disposed beneath said fan wheel and coacting with the casing to form a housing for the fan wheel, and a member downwardly extending from said partition to the tank disposed in the path of the cleaned air and forming passages for the air, the walls of which passages are designed to remove excess liquid from the air.

4. In an air cleaner, a casing having an inlet for dust-laden air and an outlet for cleaned air, a fan wheel in said casing for creating a flow from said inlet to said outlet, means for subjecting the air, in its flow through the casing, to the cleaning action of a liquid, a member disposed within said casing in the path of the cleaned air and forming passages for such air, the walls of which passages are designed to remove excess liquid from the air, and means pivotally mounting such member to afford it movement to a more convenient position for cleaning.

5. An air cleaner as set forth in claim 4, said casing having a normally closed opening giving access to the pivotal member, and such member projecting through said opening in one position of its pivotal movement.

6. A machine for treating air with a liquid comprising a plurality of fan wheels, each having a set of blades, and said sets being revoluble about a common axis, one within another to induce an air flow outwardly from such axis, and means for driving said wheels, actuating alternate sets of blades in opposite directions, and imposing progressively increased speeds on the blades from the outermost to the innermost set.

7. An air cleaner comprising a centrifugal fan wheel having a set of blades spaced outwardly from the fan wheel axis to form a chamber into which air is drawn, in rotation of the fan wheel, and spaced circumferentially to form passages for the outflow of air from such chamber, means for delivering an air-cleaning liquid into such chamber, a housing for said fan wheel having an inlet opposed to and communicating with said chamber and having an outlet to which air is delivered by the fan wheel, a tank downwardly spaced from said housing and thus adapted to provide a passage for cleaned air between the housing and the tank contents, means for delivering air to said passage from the housing outlet, a trough disposed beneath and adjacent to the housing, the housing having an opening positioned to discharge sludge and excess liquid into such trough and the trough having its ends open and in proximity to opposite walls of the tank, whereby the sludge and liquid may flow down said walls, avoiding material contamination of the cleaned air.

8. An air cleaner as set forth in claim 7, one of the tank walls being formed with an opening aligned with the tank and affording cleaning access thereto.

9. An air cleaner comprising a centrifugal fan wheel having a set of blades spaced outwardly from the fan wheel axis to form a chamber into which air is drawn, in rotation of the fan wheel, and spaced circumferentially to form passages for the outflow of air from such chamber, means for delivering an air-cleaning liquid into such chamber, a housing for said fan wheel having an inlet opposed to and communicating with said chamber and having an outlet to which air is delivered by the fan wheel, a tank downwardly spaced from said housing and thus adapted to provide a passage for cleaned air between the housing and the tank contents, means for delivering air to said passage from the housing outlet, a trough disposed beneath and adjacent to the housing, the housing having an opening positioned to discharge sludge and excess liquid into such trough and means extending downward from the trough for conducting sludge and liquid into the tank with avoidance of material contamination of the cleaned air.

RAYMOND E. VENDERBUSH.